US007055926B2

(12) United States Patent
Kojima et al.

(10) Patent No.: US 7,055,926 B2
(45) Date of Patent: Jun. 6, 2006

(54) LIQUID CONTAINER, METHOD FOR DETECTING LIQUID AMOUNT IN LIQUID CONTAINER, AND LIQUID EJECTION RECORDING APPARATUS

(75) Inventors: Yoshinori Kojima, Kawasaki (JP); Hajime Yamamoto, Fuchu (JP); Masahiko Igaki, Yokohama (JP); Eiichiro Shimizu, Hong Kong (HK); Nobuyuki Hatasa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 10/642,732

(22) Filed: Aug. 19, 2003

(65) Prior Publication Data

US 2004/0109039 A1 Jun. 10, 2004

(30) Foreign Application Priority Data

Aug. 20, 2002 (JP) ............................ 2002-239119

(51) Int. Cl.
*B41J 29/393* (2006.01)
*G01N 15/06* (2006.01)

(52) U.S. Cl. ........................................ 347/19; 250/577

(58) Field of Classification Search .................. 347/19, 347/85, 86, 87, 7; 250/577

See application file for complete search history.

(56) References Cited

U.S. PATENT DOCUMENTS

| | | | | |
|---|---|---|---|---|
| 4,246,489 | A * | 1/1981 | Yoshida et al. | 250/577 |
| 5,616,929 | A | 4/1997 | Hara | 250/573 |
| 5,997,121 | A * | 12/1999 | Altfather et al. | 347/7 |
| 6,024,428 | A * | 2/2000 | Uchikata | 347/7 |
| 6,274,880 | B1 | 8/2001 | Walker | 250/577 |
| 6,325,500 | B1 | 12/2001 | Kitabatake et al. | 347/86 |
| 6,361,136 | B1 * | 3/2002 | Watanabe et al. | 347/7 |
| 6,422,674 | B1 | 7/2002 | Hinami et al. | 347/7 |
| 6,454,400 | B1 * | 9/2002 | Morita et al. | 347/86 |
| 6,530,654 | B1 | 3/2003 | Kitabatake et al. | 347/86 |
| 6,598,963 | B1 | 7/2003 | Yamamoto et al. | 347/85 |
| 6,869,158 | B1 * | 3/2005 | Kojima et al. | 347/19 |
| 2001/0035887 | A1 | 11/2001 | Altfather et al. | 347/7 |
| 2002/0005869 | A1 | 1/2002 | Locher et al. | 347/7 |
| 2002/0041313 | A1 | 4/2002 | Koitabashi et al. | 347/86 |
| 2004/0017445 | A1 | 1/2004 | Kojima et al. | 347/19 |

FOREIGN PATENT DOCUMENTS

| | | |
|---|---|---|
| EP | 860284 | 8/1998 |
| JP | 07-218321 | 8/1995 |
| JP | 07-311072 | 11/1995 |

* cited by examiner

*Primary Examiner*—Anh T. N. Vo
(74) *Attorney, Agent, or Firm*—Fitzpatrick, Cella, Harper & Scinto

(57) ABSTRACT

A liquid container for containing liquid incldes a reflection member provided in a liquid containing portion and having a plurality of roof mirror assemblies arranged in a predetermined direction, each of the roof mirror assemblies having at least two reflecting surfaces positioned with a predetermined angle therebetween; wherein the reflection member is effective to divide incident light, which is scattering light, into a plurality of light beams by the plurality of roof mirror assemblies and to condense at a predetermined position the beams sequentially reflected by the at least two reflecting surfaces of the roof mirror assemblies, and wherein an amount of the liquid in the liquid container is detected on the basis of the light reflected by the reflection member.

6 Claims, 12 Drawing Sheets

LIQUID CONTAINER, METHOD FOR DETECTING LIQUID AMOUNT IN LIQUID CONTAINER, AND LIQUID EJECTION RECORDING APPARATUS

FIELD OF THE INVENTION AND RELATED ART

The present invention relates to a liquid container ideal to be employed by a liquid ejection recording apparatus such as an ink jet recording apparatus, a liquid ejection recording apparatus capable of detecting the amount of the liquid in the liquid container thereof, and a method for detecting the amount of the liquid in a liquid container.

A recording apparatus of an ink jet type (ink jet recording apparatus) is a recording apparatus which ejects ink from a recording means onto recording medium in order to record images. Its recording means is easy to reduce in size. Further, it is capable of recording highly precise images at a high speed.

A typical ink jet recording apparatus comprises a liquid supply system (ink supply system) and an ink container (liquid container). The ink supply system is for supplying recording ink, in the form of liquid, to a recording means (recording head). The liquid container is for holding the ink for the ink supply system, and is removably connectible with the ink supply system. Further, the ink container as a liquid container is removably (replaceably) mountable into the space provided for the ink container, in an ink jet recording apparatus.

There have been known a few methods for detecting the amount (remaining amount) of the ink in an ink container such as the ink container described above, and the presence or absence of the ink therein. For example, there are: a method which employs ROMs and a software for counting the number of times ink droplets are ejected from an ink jet recording head to calculate the amount of the ink, based on the number of times ink droplets are ejected; an optical method which places prisms on the lateral and bottom walls of an ink container, and uses the light reflected by the prisms; etc. Japanese Laid-open Patent Applications 07-218321 and 07-311072 disclose optical methods. According to these methods, an ink container is provided with an ink detecting portion comprising a transparent member, and the presence or absence of ink is detected by detecting the light projected from a light source and reflected by the ink detecting portion.

FIG. 13 is a perspective view of a typical recording apparatus of an ink jet type, showing the general structure thereof. As depicted in FIG. 13, an ink cartridge 20 comprises an ink container 7 and a recording head 1. The recording head 1 is located at the bottom portion of the ink container, and is connected to the ink container 7. The ink cartridge 20 in the drawing is structured so that the recording head 1 and ink container 7 are separable from each other, as will be described later. However, the recording head 1 and ink container may be inseparable.

Further, the ink container 7 comprises an optical prism (unshown), which is for detecting the amount of the ink remaining in the ink container 7, and which is attached to the interior surface of the bottom wall of the ink container 7.

The recording head 1 in the drawing comprises a means (for example, electrothermal transducer, laser, etc.) for generating thermal energy used as the energy for ejecting ink, more specifically, the energy for changing ink in phase. Therefore, it is capable of accomplishing a higher degree of recording density and a higher degree of precision, compared to ink jet recording heads employing an ink ejecting means which uses energy other than thermal energy in order to eject ink.

Referring to FIG. 13, the ink jet recording apparatus is provided with an optical unit (detecting apparatus) 14 for detecting the amount of the ink remaining in the ink container 7. The optical unit 14 comprises an infrared LED (light emitting element) 15 and a photo-transistor (photosensitive element) 16, which are attached to the optical unit 14 so that they align in the direction (indicated by arrow mark F) in which recording papers are conveyed. The optical unit 14 is attached to the chassis 17 of the main assembly of the image forming apparatus. The ink cartridge 20 is mounted on a carriage 2. As the ink cartridge is moved rightward from the position shown in FIG. 13, it comes to the position above the optical unit 14. In this position, the optical unit 14 is able to detect the presence or absence of the ink in the ink container 7, through the bottom wall of the ink container 7.

FIG. 14 is a schematic drawing showing the positional relationship among the ink detecting portion, the light emitting element which projects light on the ink detecting portion, and the photosensitive portion. The ink detecting portion is a transparent member with which the ink container is provided, and the light emitting element projects light on the ink detecting portion. The photosensitive element intercepts the light from the light emitting element. FIG. 14(A) shows the ink container in which ink is present, and FIG. 14(B) shows the ink container in which ink is absent.

Referring to FIGS. 14(A) and 14(B), the light from the light emitting element 31 (light source) enters the ink detecting portion (prism or the like) 50 from below the bottom wall of the ink container 7. The light detecting portion 50 is an integral part of the transparent bottom wall of the ink container 7. When there is ink 44 in the ink container 7 as shown in FIG. 14(A), the light from the light emitting element 31, which enters the ink container 7 from below is absorbed while it travels through light path 1→light path 2'. Thus, the light does not reach the photosensitive element 32. On the other hand, after the ink in the ink container 7 has been completely consumed, that is, when there is no ink in the ink container 7 as shown in FIG. 14(B), the light entering the ink container 7 from below is deflected by the slanted surfaces of the ink detecting portion (prism or the like) 50, which is an integral part of the transparent bottom wall of the ink container 7, and reaches the photosensitive element 32 through light path 1→light path 2→light path 3. In other words, whether or not ink is present in the ink container 7 is determined based on whether or not the light projected from the light emitting element 31 reaches the photosensitive element 32. The light emitting element 31 and photosensitive element 32 are on the main assembly of the image forming apparatus.

However, a liquid container such as an ink container having the above described optical deflection system suffers from the following technical problems. That is, although it is capable of detecting the presence or absence of ink in an ink container, it is incapable of analogically detecting the amount of the ink remaining in the ink container while the ink in the ink container is being consumed. Admittedly, there is an ink remainder detection system which employs an auxiliary means for counting the number of times (dot count) ink droplets are ejected from an ink jet recording head, being therefore capable of detecting the remaining amount of the ink. However, such a system is very complicated, which is a problem.

As one of the means for analogically detecting the amount of the ink remainder with the use of the above described optical deflection system, it is possible to consider a method in which a plurality of ink detecting portions (prisms or the like) formed of transparent material are arrayed in parallel, on one of the side walls of an ink container, in the depth direction of the ink (height of body of ink). Such an arrangement, however, requires the range, across which the light deflected by the ink detecting portions (prisms or the like) formed of transparent material is received, to be rather large, making it necessary to employ a larger number of detecting apparatuses comprising a light emitting element and a photosensitive element, more specifically, to provide the above described detecting apparatus for each of the plurality of ink detecting portions (prisms or the like) formed of transparent material, which increases the cost of an ink jet recording apparatus.

If only one detecting apparatus is employed for the plurality of ink detecting portions (prisms or the like), the farther the distance from a given ink detecting portion (prism or the like) to the detecting apparatus (only detecting apparatus), the smaller the amount (intensity) of the light deflected by the given ink detecting portion (prism or the like), in relation to the amount (intensity) of the light emitted from the light emitting element, which is obvious. Thus, such a setup might result in detection errors. Thus, in order to prevent detection errors (assure detection accuracy), it is necessary to increase the amount of the light deflected (received) by the ink detecting portion (prism or the like). In order to increase the amount of the light deflected by the ink detecting portion (prism or the like), it is necessary to provide a light emitting element with a higher output. The provision of a light emitting element with a higher output results in such problems as the increase in the cost of the main assembly of an ink jet printer, increase in power consumption, etc. In addition, placing the plurality of ink detecting portions (prisms or the like) on one of the side walls, and bottom wall, of the ink container requires a substantial space, reducing latitude in apparatus design.

SUMMARY OF THE INVENTION

The present invention was made in consideration of the above described problems, and its primary object is to provide: a liquid container, the amount of the liquid (ink) in which can be analogically detected; a method for detecting the amount of the liquid in a liquid container; and a liquid ejection recording apparatus.

The present invention made to accomplish the above described object is characterized in that a liquid container for containing a liquid comprises: a reflective member having a plurality of roof mirrors, which have a minimum of two reflective surfaces angled relative to each other at a predetermined angle, and that the plurality of roof mirrors are arrayed in parallel, on a predetermined portion of a liquid storing portion of the liquid container, in a predetermined direction, so that as the divergent light from a light source enters the reflective member, it is sequentially deflected by a minimum of two reflective surfaces of each of the roof mirrors, being thereby divided into a plurality of fluxes of light which condense to a predetermined area to make it possible to detect the amount of the light deflected by the reflective member to determine the amount of liquid in the liquid container.

According to the above described structural arrangement, a reflective member having a plurality of roof mirrors, which have a minimum of two reflective surfaces connected to each other at a predetermined angle, and which are arrayed in parallel, in a predetermined direction, on a predetermined portion of a liquid storing portion of the liquid container, so that as the divergent light from a light source enters the reflective member, it is sequentially deflected by a minimum of two reflective surfaces of each of the roof mirrors, being thereby divided into a plurality of fluxes of light which condense to a predetermined area. Therefore, even if the liquid storing portion is provided with only one detecting apparatus, it is assured that the amount of the liquid in the liquid container can be analogically detected based on the width and height of the pattern of the graph showing the changes in the amount (intensity) of the light deflected by the reflective member and detected by the photosensitive member.

These and other objects, features, and advantages of the present invention will become more apparent upon consideration of the following description of the preferred embodiments of the present invention, taken in conjunction with the accompanying drawings.

DETAILED DESCRIPTION OF THE PREFERRED EMBODIMENTS

Hereinafter, the preferred embodiments of the present invention will be described with reference to the appended drawings. Incidentally, when a given component, member, portion, or the like in one drawing is the same in referential symbol as a given component, member, portion, or the like in another drawing, the two correspond to each other.

Figure 1:
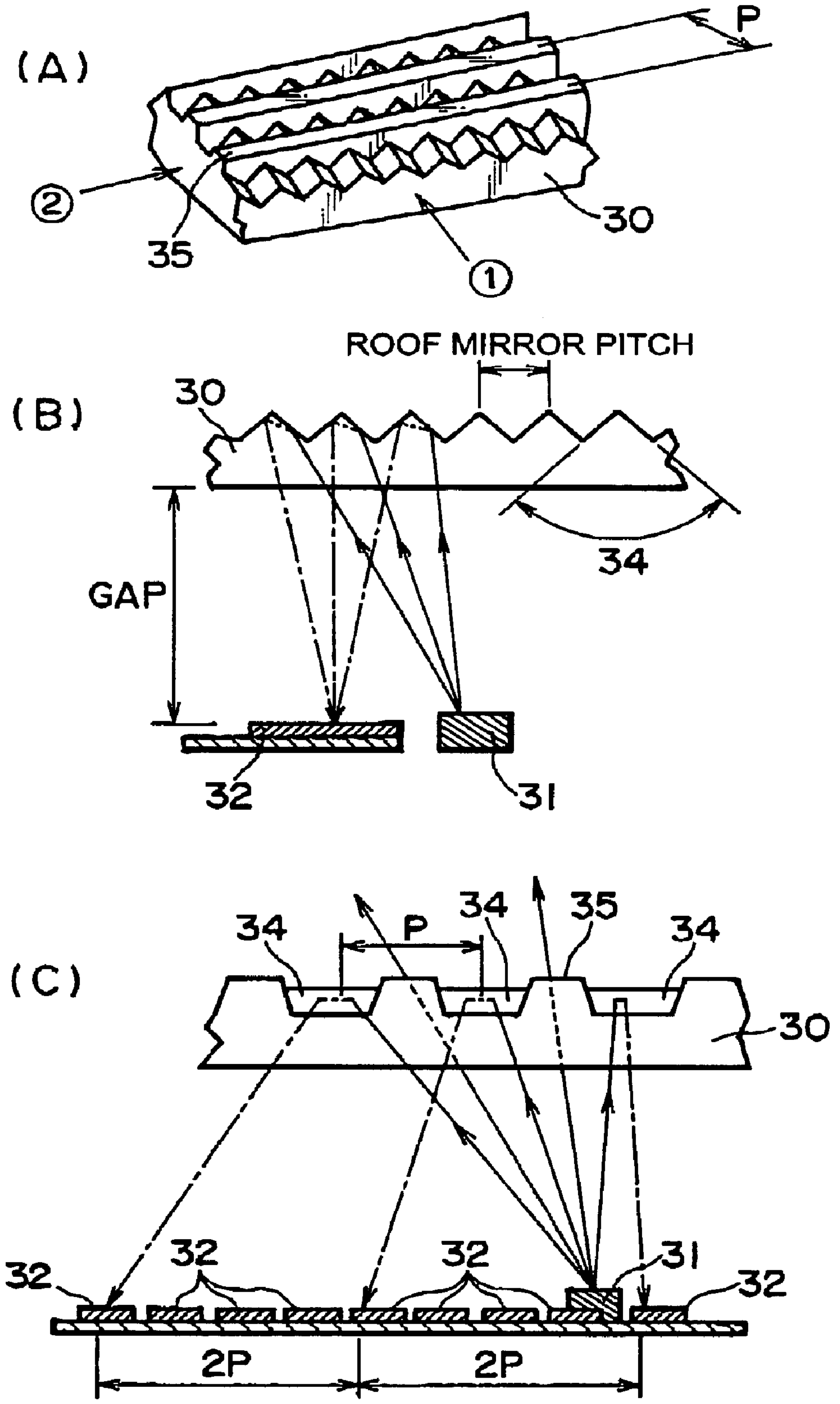
FIG. 1 is a schematic drawing for describing the optical properties of the reflective member of the liquid container in accordance with the present invention, in the first embodiment of the present invention, FIG. 1(*a*) being a perspective view thereof, FIG. 1(*b*) showing the optical relationship between the reflective member and detecting apparatus, as seen from the direction 1 in FIG. 1(*a*), and FIG. 1(*c*) showing the relationship between the reflective member and detecting apparatus, as seen from the direction 2 in FIG. 1(*a*).

FIG. 1 is a drawing for describing the optical properties of the reflective member of the liquid container in accordance with the present invention, FIG. 1(*a*) being a perspective view thereof, FIG. 1(*b*) showing the optical relationship between the reflective member and detecting apparatus, as seen from the direction 1 in FIG. 1(*a*), and FIG. 1(*c*) showing the relationship between the reflective member and detecting apparatus, as seen from the direction 2 in FIG. 1(*a*).

The reflective means shown in FIG. 1 comprises a plurality of rows of reflective members 30. The rows of reflective members 30 are disposed in parallel with a pitch of P. Each reflective member (which may be referred to as roof mirror unit) 30 is a transparent member (formed of transparent resin, for example), and comprises a plurality of roof-shaped mirrors 34 having two reflective surfaces connected at a predetermined angle (96° in this embodiment). The roof-shaped mirrors (which hereinafter will be referred to simply as roof mirrors) are arrayed in parallel in a predetermine direction. Each reflective member 30 is positioned so that the reflective surfaces of each roof mirror constitute a part of the top surface of the reflective member 30, and that the nonreflective surface of each roof mirror constitutes a part of the bottom surface of the reflective member 30. The roof mirror pitch P of the reflective member in FIG. 1 is 84 μm, and the measurement of each roof mirror is 84 μm×100 μm.

There is disposed a detecting apparatus below the reflective member 30. The detecting apparatus comprises a point-source light 31 and a photosensitive element 32, which are parts of a photo IC chip. The reflective member 30 and the photosensitive element 32 are disposed so that a predetermined gap (GAP in FIG. 1(*b*)) is provided between the bottom surface of the former and the photosensitive intercepting surface of the latter. In FIG. 1(*b*), the light emitting side and light intercepting side are separate. However, they may be integral. In fact, in actual production, they are integral.

The fundamental condition for the roof mirror 34 of the reflective member 30 to be reflective is that the surface of the roof mirror 34 is in contact with a substance, other than liquid, which is different in refractive index from the material of the roof mirror 34. For example, if the material of the reflective member 30 is a transparent resin, the reflective member 30 reflects light when the substance in contact with the surface of the roof-mirror 34 is air, but it transmits light when the substance in contact with the surface of the roof-mirror is ink.

Referring to FIGS. 1(*b*) and 1(*c*), the light paths of the light from the light emitting side (point-source light 31) to the light intercepting side (photosensitive element of photo IC chip) are indicated by solid lines and single-dot chain lines, to show the manner in which the light from the point-source light 31 converges to the photosensitive element after being deflected by the reflective member 30. More specifically, the single-dot chain lines represent the light paths after the light is deflected by the reflective member 30. Further, the light emitting side is not provided with a condensing means such as a lens. Therefore, the light intercepted by the photosensitive element is divergent light.

The light (divergent light) irradiated from the point-source light 31 enters the transparent reflective member 30, is deflected twice by the processed surfaces of the roof mirrors 34, and is condensed on the light intercepting side (array of photosensitive elements 31), in a pattern of a narrow band, across a predetermined area. In other words, as the light is deflected by the reflective member 30 in a manner to be one-dimensionally converged (FIG. 11); the divergent light from the point-source light is deflected by the plurality of roof mirrors (divided into plurality of apparent fluxes of light which are different in light source), so that it is condensed on the array of photosensitive elements, across the predetermined area. Referring to FIG. 1(*c*), across the array of the photosensitive elements, a grid pattern (enlarged pattern of roof mirrors of reflective member), the pitch P of which is twice that of the roof mirrors of the reflective member 30 is formed.

Next, referring to FIGS. 2–6, the characteristic features of the reflective member in accordance with the present invention will be described through comparison between the reflective member in accordance with the present invention, the reflective area of which is covered with a light reflecting means of a one-dimensional convergent type (property which causes light to one-dimensionally converge), and an ordinary reflective member, the reflective area of which has a flat surface coated with reflective aluminum film.

Figure 2:
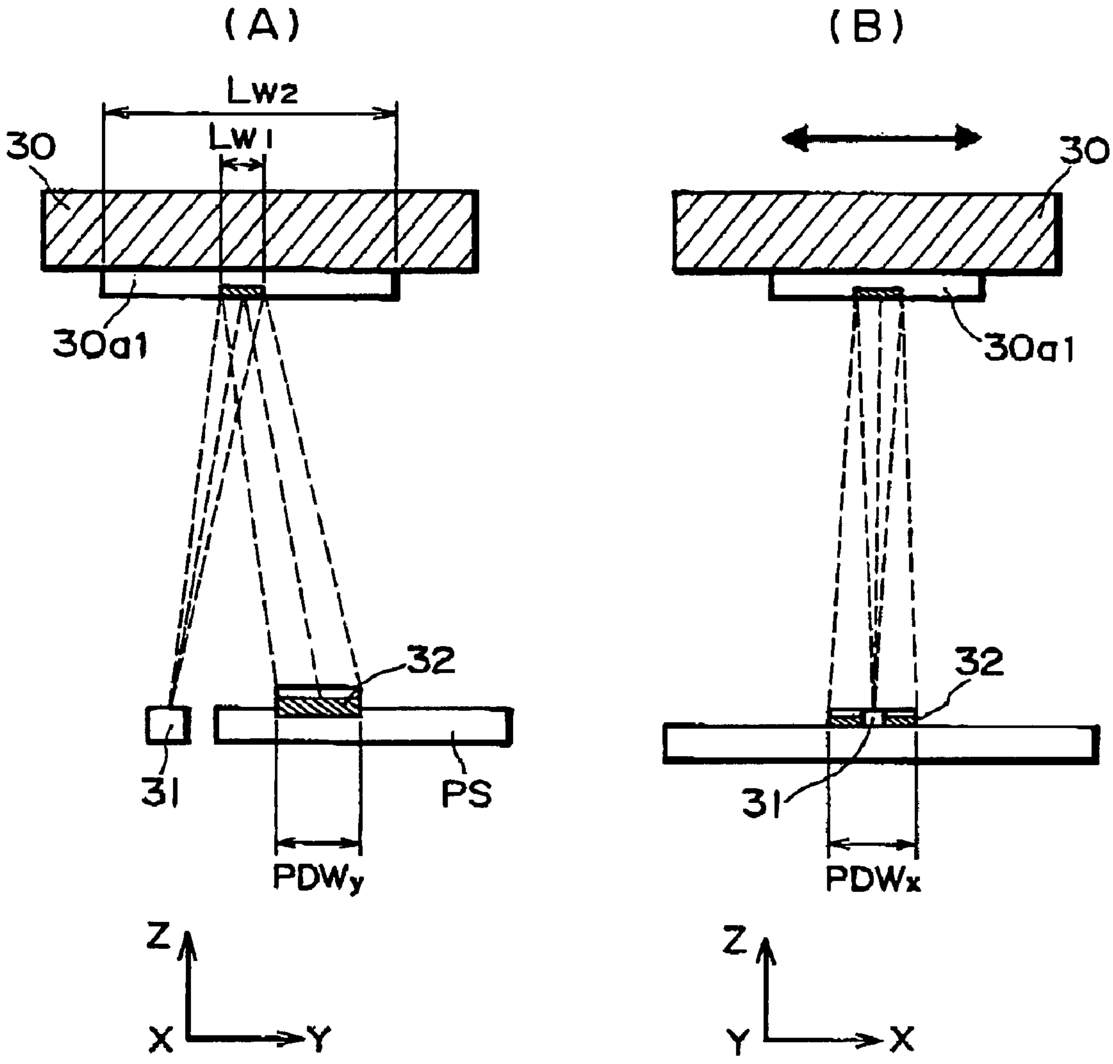
FIG. 2 is a schematic drawing for describing the optical properties of the reflective member, the reflective area of which is flat and is coated with reflective aluminum film.

FIG. 2 is a schematic drawing for describing the reflective member having a flat reflective surface coated with reflective aluminum film, and the path through which a flux of light from the light source 31 of the photosensor PS is guided to the photosensitive element 32 by way of the reflective surface **30*a*1 of the reflective member 30. FIG. 2 shows: the light source 1; photosensitive element 32 which is PDWy×PDWx in the size of the light sensitive area; and reflective member 30 having the flat reflective surface 30*a*1 coated with reflective aluminum film. In the drawing, the dotted lines represent the light path from the light source to the photosensitive element by way of the reflective member. For geometrical reasons, the width Lw1 of the area of the reflective aluminum film 30*a*1 illuminated by the effective portion of the light flux is half the width PDWy of the photosensitive area of the photosensitive element 32 (Lw1=½PDWy). Thus, when the size of the photosensitive element 32 is 400 μm, the size of the area of the reflective aluminum film 30*a*1 illuminated by the effective portion of the flux of light is roughly 200 μm. In other words, the amount by which the light from the light source 31 reaches the photosensitive element 32** is extremely small.

Figure 3:
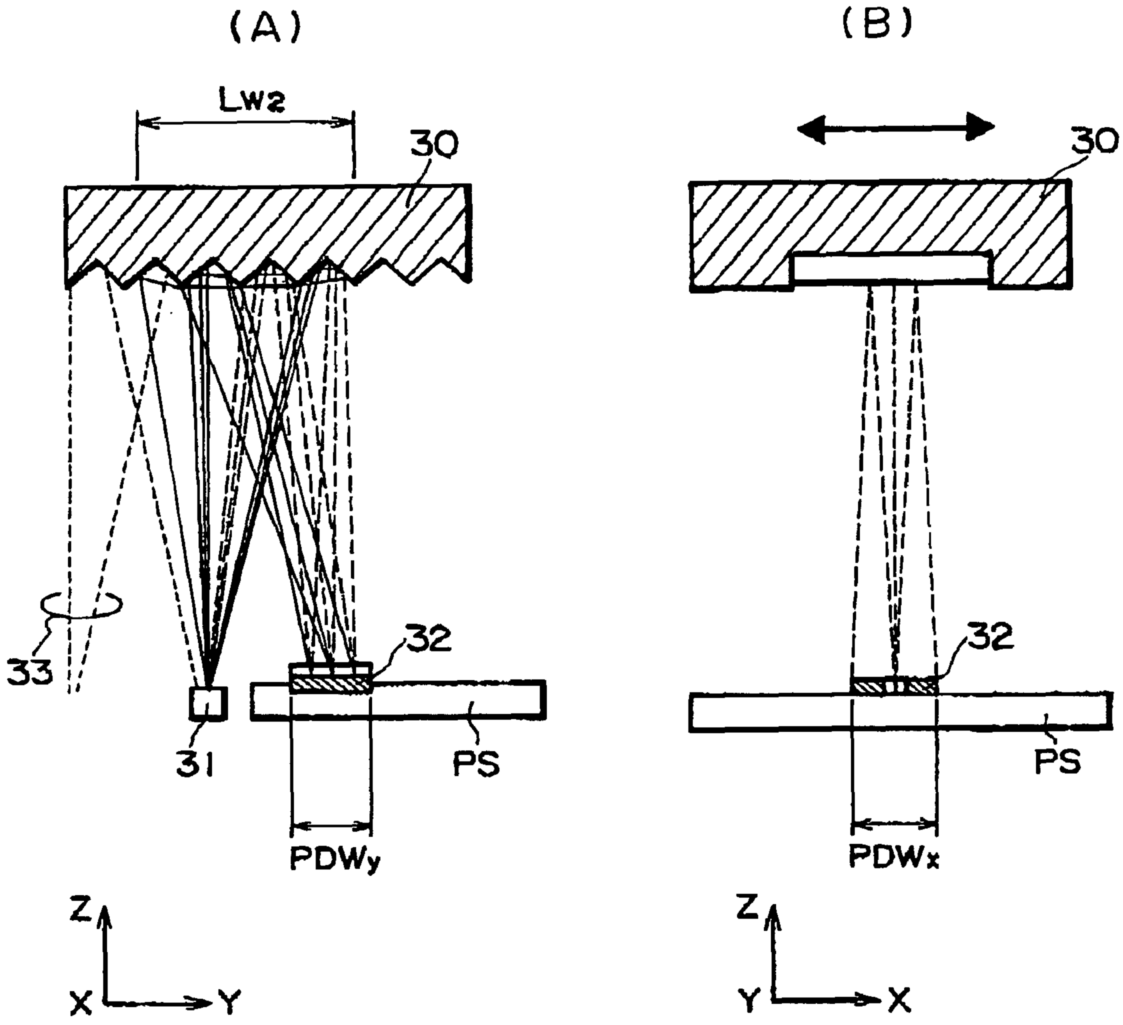
FIG. 3 is a schematic drawing for showing the paths of the fluxes of light deflected by the reflective area of the reflective member, which comprises a plurality of V-shaped straight grooves, which have two reflective surfaces connected in the shape of a roof (which also is called one-dimensional convergence reflective means or roof mirror), and which are arrayed in parallel.

The relationship between the gap (distance) between the photosensor PS and reflective member, and the amount of the light which the photosensitive element 32 intercepts, is represented by the following equation: amount of light=1/(distance)$^2$. FIG. 3 is a schematic drawing showing the light paths from the light source to the photosensitive element by way of the reflective member 30 in accordance with the present invention, the reflective area of which comprises a plurality of V-shaped straight grooves, the slanted surfaces of which are reflective (roof mirrors). In FIG. 3, it is presumed that the slanted walls of each V-shaped groove are virtually equal in reflectivity to reflective aluminum film. The angle (Ra) between the two slanged walls of each V-shaped groove is set to roughly 95° in order to cause the light from the light source 31 to follow a path similar to the path shown in FIG. 2. The light path shown in FIG. 3(B), which is the light path seen from the direction perpendicular to the lengthwise direction of the groove, is the same as the light path shown in FIG. 2(B). However, in FIG. 3(A) which shows the light path seen from the direction parallel to the lengthwise direction of the groove, the width Lw2 of the area of the reflective area of the reflective member 30 corresponding to the photosensitive area of the photosensitive element 32 is much wider than the width Lw1 in FIG. 2(A). In other words, the reflective member 30 shown in FIG. 3 guides, by a larger amount, the light from the light source 31 to the photosensitive element 32 of the photosensor PS.

Since the light source 31 is positioned apart from the photosensitive element 32, the light can be guided to a target area by adjusting the angle Ra of the two reflective slant walls of each groove. In this embodiment, the angle Ra is set to roughly Rb·X5. Therefore, not only is the light from the light source 31 guided to the photosensitive element 32, but also to the area symmetrical in position to the photosensitive element 32 with respect to the light source 31 (light path 33 indicated by dotted lines in FIG. 3(A)).

Figure 4:
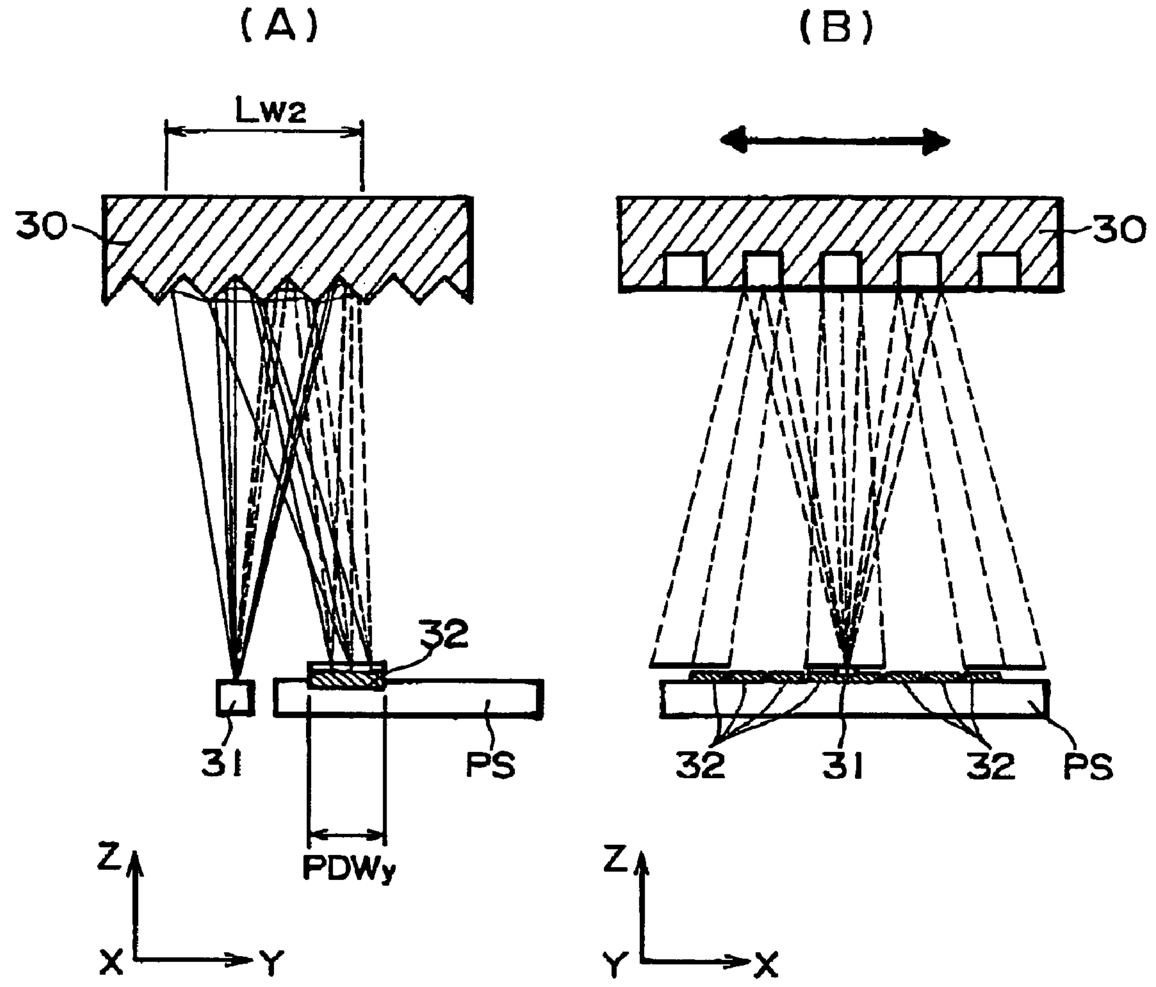
FIG. 4 is a schematic drawing depicting the plurality of reflective members, which have a plurality of V-shaped grooves, and which are disposed in parallel.

FIG. 4 is a schematic drawing for depicting the reflective member (roof mirror unit) 30 having a plurality of rows of a large number of V-shaped grooves, the slanted walls of which are reflective. It also shows the paths through which the light from the light emitting element 31 of the photosensor PS is guided to the array of photosensitive elements 32 by way of the reflective member 30. Basically, this arrangement is the same as that in FIG. 3. Therefore, the description of the arrangement will not be given here. Also in this arrangement, the light from the light source 31 is guided, by a greater amount, to the photosensitive elements 32 by way of the reflective member 30, compared to the reflective member shown in FIG. 2 having the flat reflective area coated with reflective aluminum film.

Figure 5:
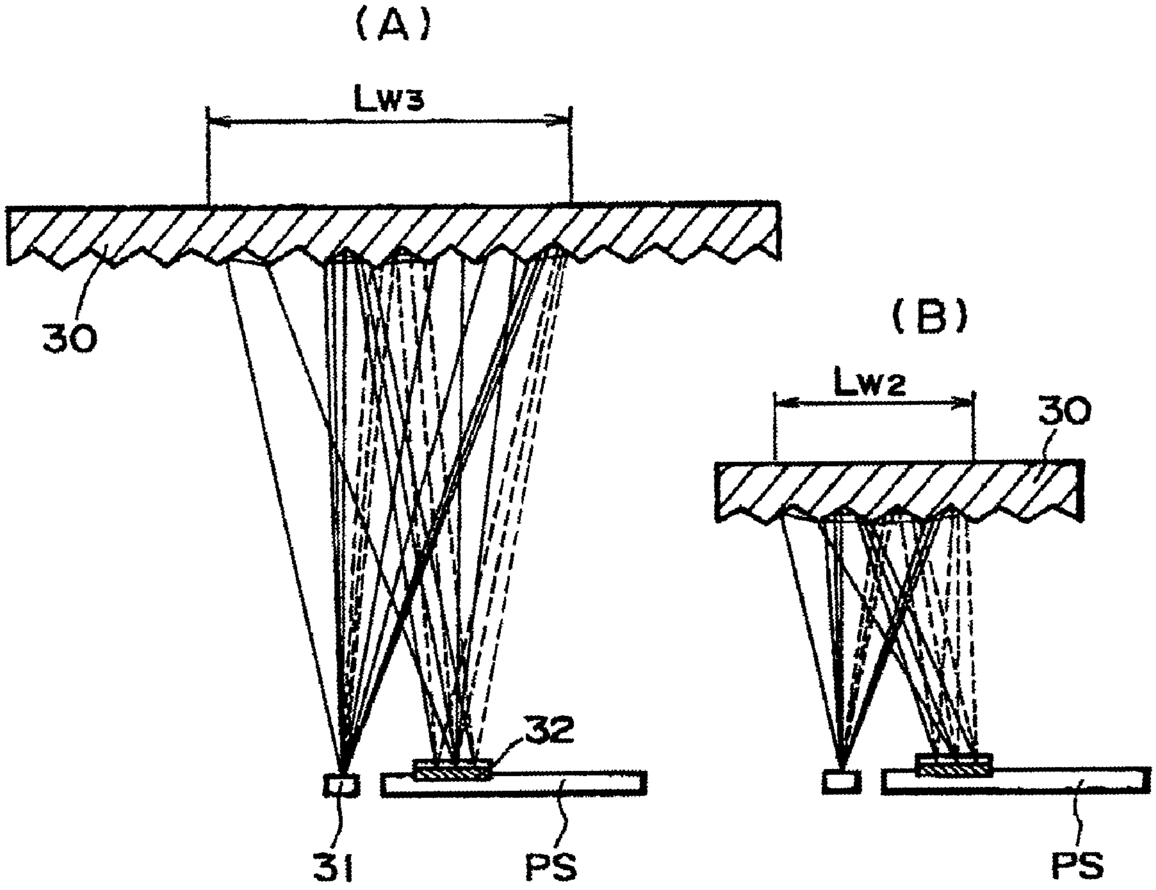
FIG. 5 is a schematic drawing for describing an additional effect of the reflective member in accordance with the present invention.

FIG. 5 is a schematic drawing for depicting the effect of the reflective member in accordance with the present invention, which is different from the above described one. It relates to the relationship between the performance of the liquid amount detecting means and the gap (distance) between the photosensor PS and reflective member 30. FIG. 5(A) shows the case in which the gap (distance) between the photosensor PS and reflective member 30 is greater than the normal distance, and FIG. 5(B) shows the case in which the gap (distance) between the photosensor PS and reflective member 30 is normal.

In the reflective member structured as shown in FIG. 2, the amount of light detected by the photosensitive element is practically proportional to 1/(distance)$^2$. Thus, if the gap between the reflective member and photosensor PS, shown in FIG. 2, is doubled, as is the relationship between the distance between the reflective member and photosensor PS in FIG. 5(A) and that in FIG. 5(B), the amount of light intercepted by the photosensitive element 32 is reduced to nearly 25%; the amount of the light detected by the photosensitive element 32 in FIG. 5(A) is nearly 25% of the amount of the light detected by the photosensitive element 32 in FIG. 5(B).

In the case of the setup which employs a reflective member in accordance with the present invention, the amount by which the light is detected by the photosensitive element 32 in terms of the direction perpendicular to the lengthwise direction of the roof mirror, shown in FIG. 3(A), is not affected by the changes in the gap (distance) between the reflective member and photosensor PS, which also will be evident from FIGS. 5(A) and 5(B). On the other hand, the amount by which the light is detected by the photosensitive element 32 in terms of the direction parallel to the lengthwise direction of the roof mirror, shown in FIG. 3(B), is 1/(distance)$^2$. In other words, a reflective member in accordance with the present invention is superior also in terms of the amount by which the light from the light source is detected by a photosensitive portion, and the amount by which the amount of the light source is detected by the photosensitive portion is affected by the changes in the gap between the reflective member and photosensitive receiving portion.

Figure 6:
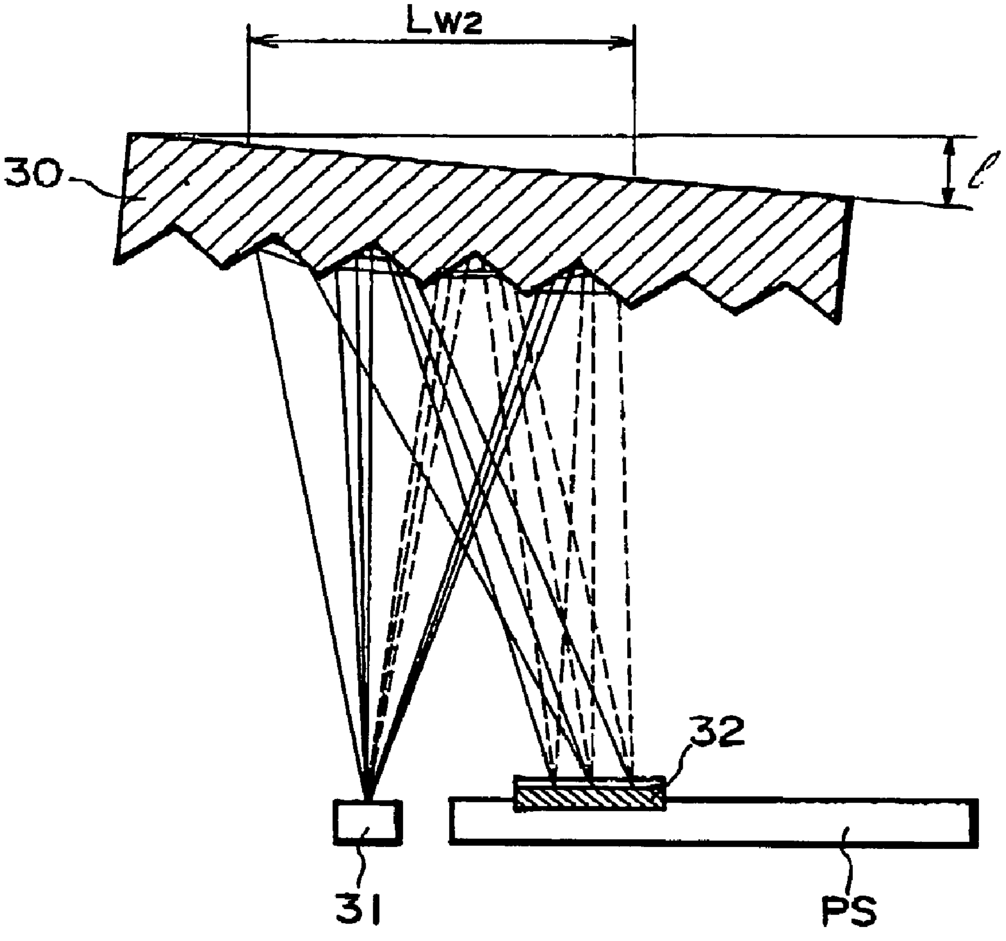
FIG. 6 is a schematic drawing for describing another effect of the reflective member in accordance with the present invention.

FIG. 6 is a schematic drawing describing another effect of the reflective member in accordance with the present invention, which is different from the effect described first, and relates to relationship between the performance of the liquid amount detecting means and the angle (θ) of the reflective member relative to the photosensor PS. As is evident from the drawing, in the case of the light amount detecting means employing a reflective member in accordance with the present invention, the light path through which the light from the point-source light is guided to the photosensitive portion 32 by the reflective member 30 is not affected by the changes in the angle (θ) of the reflective member 30 relative to the photosensitive surface of the photosensitive portion 32.

As will be evident from the above descriptions, the employment of the reflective member 30 in accordance with the present invention, the reflective area of which has a single or plurality of arrays of V-shaped grooves, the two slanted walls of which are reflective, is beneficial in that it increases the absolute amount by which the light from a point-source light is guided to the photosensitive portion 32 of the photosensor PS, compared to the employment of a reflective member, the reflective area of which is flat as shown in FIG. 2. Further, it reduces the amount of the effect of the changes in the distance (gap) between the reflective member and photosensor, upon the amount by which the light is intercepted by the photosensitive portion. Further, it makes the amount by which the light is intercepted by the photosensitive portion, insensitive to the angle (θ) of the reflective member relative to the photosensor, preventing the amount by which the light is detected, from reducing by a large amount by the changes in the angle (θ) of the reflective member.

Next, referring to FIGS. 7–10, the various modifications of the reflective member having the above descried optical properties will be described.

Figure 7:
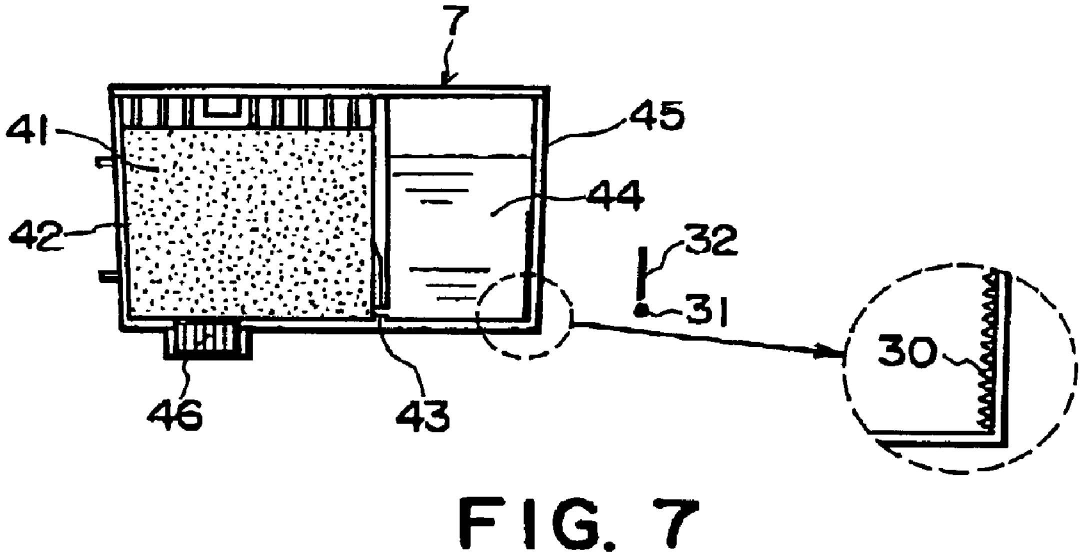
FIG. 7 is a schematic sectional view of a typical liquid container compatible with a liquid amount detecting means in accordance with the present invention.

Referring to FIG. 7, hereinafter, the embodiments of the present invention will be described with reference to the ink container 7 (liquid container) to which the reflective member in accordance with the present invention is attached comprises: a chamber 42 in which an ink absorbing member 41 formed of sponge or the like is stored; a liquid storage chamber 45 in which in which ink 44 is directly stored, and a connective path 43 connecting the ink absorbing member chamber 42 and liquid storage chamber 45. The ink container 7 also comprises an ink outlet 46, which is attached to the ink absorbing member chamber 42, and through which the ink within the ink container 7 is supplied to an ink jet recording head (unshown) which ejects ink, as recording liquid, to record images. However, not only is the reflective member 30 in accordance with the present invention, having a single or plurality of arrays of roof mirrors applicable to the above described ink container 7, but also it is applicable to a simple ink container in which ink is directly stored, an ink container the entirety of which is filled with an ink absorbing member in which ink is stored, etc. In other words, the reflective member in accordance with the present invent invention is compatible with any liquid container.

Referring to FIG. 7, the reflective member 30 is attached to the inward surface of one of the walls of the liquid storage chamber 45, perpendicular to the bottom wall of the liquid storage chamber 45. It vertically extends from the bottom wall. The detecting apparatus (unshown) comprising the combination of a single-source light (light emitting element) 31 and photosensitive element 32 is solidly attached to a location which is outside the ink container 7, and which directly faces the reflective member 30 attached to the ink container 7. The structural arrangement shown in FIG. 7 is not intended to limit the application of the present invention. For example, when applying the present invention to an ink container much larger than the one shown in FIG. 7, the size of the photosensitive element may be increased corresponding to the amount of the ink in the larger ink container, or the distance between the single-source light and detecting apparatus may be increased by increasing the output of the single-light source light, or the detecting apparatus may be moved instead of the ink container. In case the internal space of the ink jet recording apparatus makes it difficult to attach the above described detecting apparatus to the location which faces one of the side walls of the ink container, a light guiding member such as a piece of optical fiber or the like may be employed to guide the light from the light emitting element of the detecting apparatus to the point from which the light is projected toward the side wall of the ink container having the reflective member, or to guide the light reflected by the reflective member to the photosensitive element of the detecting apparatus, so that the detecting apparatus can be attached to a location, for example, a location facing the bottom wall of the ink container, which does not face the aforementioned side wall of the ink container. As described above, the liquid container is formed of a transparent resin such as PP, PE, or the like, and the reflective member 30 is attached to the liquid container so that when the ink reflective member 30 is completely submerged in the liquid (ink) in the ink container, the reflective surfaces of each roof mirror 34 of the reflective member 30 remain in contact with the liquid (ink) in the ink container. Further, the reflective member in accordance with the present invention is usable with (attachable to) any liquid container (ink container) regardless of its type, as long as it is structured as described above. Using the same transparent material as that for the liquid container, as the material for the reflective member 30, makes it possible to form the reflective member with the use of one of the injection molding methods, making it thereby easier to manufacture the reflective member (ink container).

The ink container 7 is removably mountable, alone or by two or more, on the carriage of a recording apparatus, which is shuttled in the direction intersectional to the moving direction of a recording sheet. When two or more ink containers 7 are mounted, they are disposed in parallel to each other and perpendicular to the moving direction of the carriage.

Referring to FIG. 1(*c*), each reflective member 30 comprises a plurality of roof mirrors, and the portion 35 between the two adjacent reflective members 30 is structured so that the light projected onto the portion 35 from the detecting apparatus side is allowed to transmit straight through the portion 35. This portion 35, however, may be structured in the form of a flat roof as shown in FIG. 1(*a*), or in the form of a valley. In other words, the shape of the portion 35 may be determined in accordance with the method used for forming the portion 35 (reflective member; ink container), or required degree of accuracy. In the drawings referenced in the following description of the embodiments of the present invention, for example, FIG. 8(*b*) or FIG. 9(*b*), the portion 35 of the reflective member 30 is not shown. However, even if a reflective member is structured as shown in FIG. 1(*a*), its optical properties are virtually the same as those of the reflective members 30 in the drawings referenced in the following description of the embodiments of the present invention.

Embodiment 1

Figure 8:
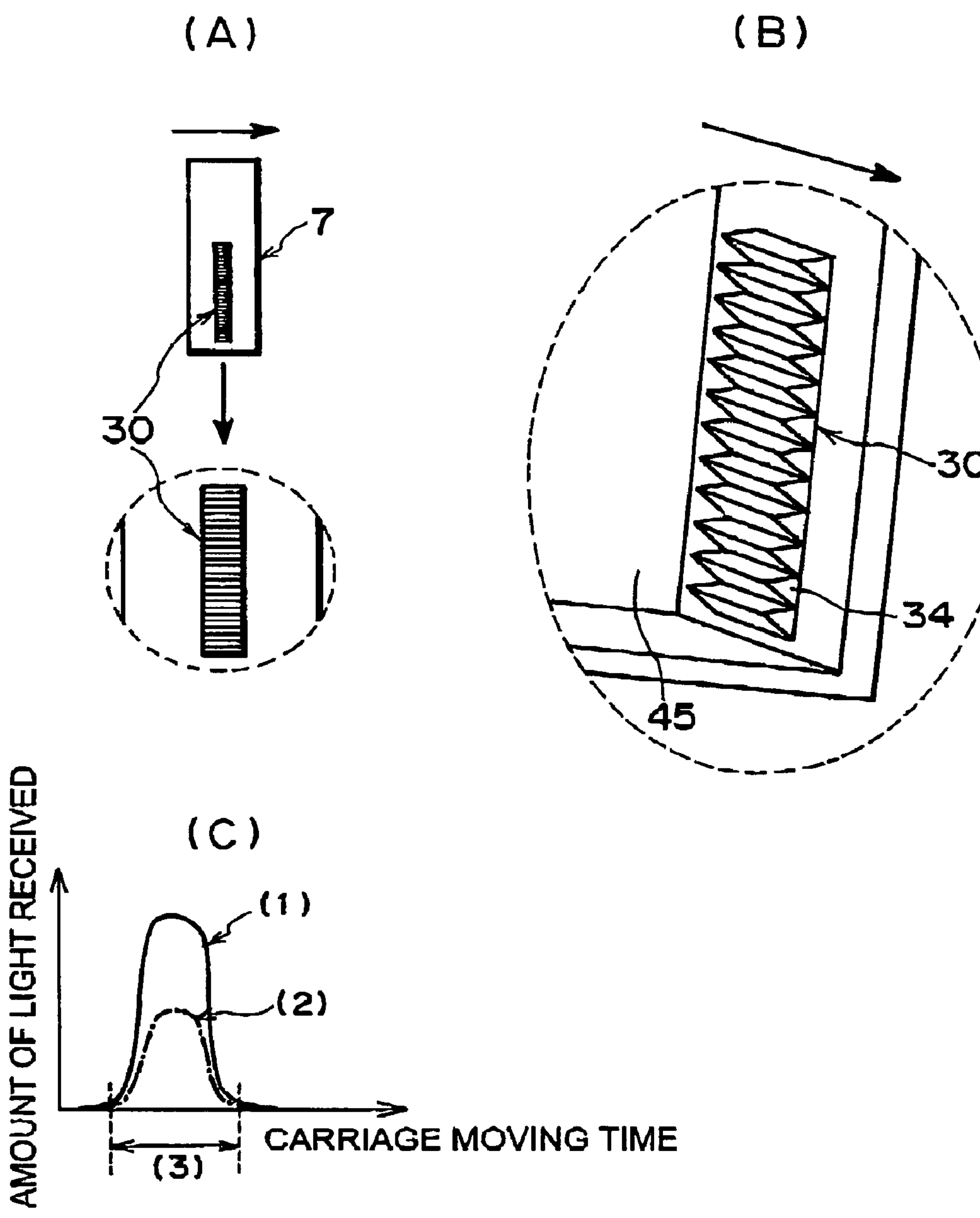
FIG. 8 is a schematic drawing for describing the reflective member in the first embodiment of the present invention, FIG. 8(*a*) being an enlarged plan view of the roof mirror portion of the reflective member on one of the side walls of the ink container, FIG. 8(*b*) being a perspective view of the roof mirror portion of the reflective member, and FIG. 8(*c*) being a graph showing the changes in the amount of the light intercepted by the photosensitive side when the roof mirrors are arranged in the pattern in the first embodiment.

FIG. 8 is a drawing for depicting the reflective member in the first embodiment of the present invention, FIG. 8(*a*) being an enlarged plan view of the roof mirror portion of the reflective member on one of the side walls of the ink container, FIG. 8(*b*) being a perspective view of the roof mirror portion of the reflective member, and FIG. 8(*c*) being a graph showing the changes in the amount of the light deflected by the reflective member and detected by the photosensitive member, in the first embodiment. More specifically, FIG. 8(*b*) is a perspective view of the inward side of the reflective member, with respect to the ink container 7. Next, the embodiments of the present invention will be described in detail.

Referring to FIG. 8(*a*), the reflective member (roof mirror unit) 30 is attached to one of the side walls of the ink container 7, being positioned so that the direction in which the plurality of roof mirrors are arrayed in parallel becomes perpendicular to the moving direction A of the ink container 7 (moving direction of carriage).

As the ink container 7, on which the plurality of roof mirrors are arrayed as described above, that is, are disposed on the reflective area of the reflective member (roof mirror unit) 30 so that they become perpendicular to moving direction of carriage, is moved by the carriage in the direction A, the pattern of the graph showing the changes in the amount of the light intercepted by the photosensitive element shown in FIG. 1 becomes as shown in FIG. 8(*c*). As will be evident from the distribution, in FIG. 8(*c*), of the amount of the light intercepted by the photosensitive element, relative to the elapsed time from the beginning of the movement of the carriage, the difference in the number of the roof mirrors in contact with the ink affects the peak value of the amount (intensity of reflected light) of the light intercepted by the photosensitive element, as indicated by the peak values (1) and (2) in FIG. 8(*c*). This occurs because the roof mirrors in contact with the ink transmit light, that is, do not reflect light. More specifically, as the liquid (ink) in the liquid container 45 is consumed, the liquid (ink) level in the liquid container 45 falls in the direction indicated by an arrow mark B in FIG. 8(*b*) (from top side of reflective member 30 toward bottom side), gradually exposing the roof mirrors one by one. The roof mirrors in contact with the ink transmit light, that is, do not reflect light, as described earlier regarding the optical properties of the reflective member. Therefore, as the number of the roof mirrors 34 of the reflective member 30, which are not in contact with the ink, increases (number of roof mirrors 34 in contact with ink decreases), the amount (intensity) of the light reflected by the reflective member increases, for example, from the value (2) to the value (1) in FIG. 8(*c*). Incidentally, the width (3) of the pattern of the graph in FIG. 8(*c*) corresponds to the width of the reflective member (roof mirror unit) 30 (in terms of direction perpendicular to direction in which roof mirrors are arrayed in parallel).

Thus, the amount of the liquid (ink) can be analogically detected based on the changes in the peak value of the amount (intensity) of the light reflected by the reflective member (roof mirror unit) 30. Incidentally, in the present invention, peak means the peak of the wave form (pattern) on the time axis (X axis) in FIG. 8(*c*).

Embodiment 2

This embodiment is similar to the first embodiment, except that the width of the reflective member, in terms of the direction perpendicular to the direction in which the plurality of roof mirrors of the reflective member are arrayed in parallel, is gradually changed. Next, this embodiment will be described in detail.

Figure 9:
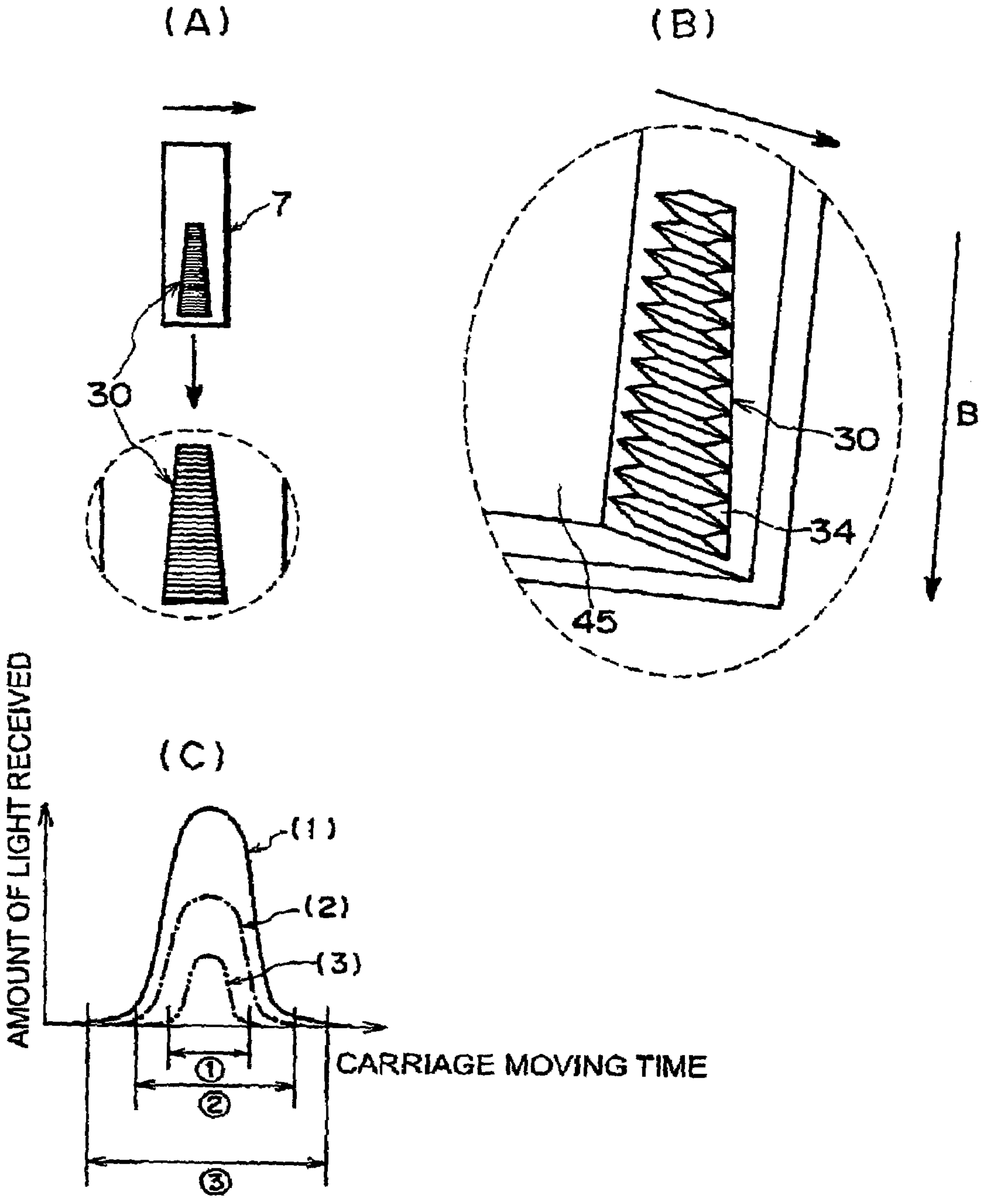
FIG. 9 is a schematic drawing for describing the reflective member in the second embodiment of the present invention, FIG. 9(*a*) being an enlarged plan view of the roof mirror portion of the reflective member on one of the side walls of the ink container, FIG. 9(*b*) being a perspective view of the roof mirror portion of the reflective member, and FIG. 9(*c*) being a graph showing the changes in the amount of the light intercepted by the photosensitive side when the roof mirrors are arranged in the pattern in the second embodiment.

FIG. 9 is a drawing for depicting the reflective member in the second embodiment of the present invention, FIG. 9(*a*) being an enlarged plan view of the roof mirror portion of the reflective member on one of the side walls of the ink container, FIG. 9(*b*) being a perspective view of the roof mirror portion of the reflective member, and FIG. 9(*c*) being a graph showing the changes in the amount of the light received by the reflective member in the second embodiment of the present invention.

Referring to FIG. 9(*a*), the reflective member (roof mirror unit) 30 is attached to one of the side walls of the ink container 7, being positioned so that the direction in which the plurality of roof mirrors are arrayed in parallel becomes perpendicular to the moving direction A of the ink container 7 (moving direction of carriage). Further, the width of the reflective member (roof mirror unit) 30, in terms of the direction perpendicular to the direction in which the plurality of roof mirrors of the reflective member are arrayed in parallel, gradually decreases toward the top side; the dimension of each roof mirror of the reflective member in terms of the direction perpendicular to the direction in which the roof mirrors are arrayed in parallel (in terms of moving direction A of carrier) is such that the closer to the top of the ink container, the smaller by a predetermined amount than that of the roof mirror next thereto on the bottom side of the ink container.

As the ink container 7, on which the plurality of roof mirrors different in length are arrayed as described above, is moved by the carriage in the direction A, the pattern of the graph showing the changes in the amount of the light received by the photosensitive element shown in FIG. 1 becomes as shown in FIG. 9(*c*). In this embodiment, the plurality of roof mirrors of the reflective member 30 on one of the side walls of the ink container are different in dimension in terms of the direction perpendicular to the direction in which they are arrayed in parallel, and are disposed so that the closer to the top of the ink container a given roof mirror is, the smaller by a predetermined amount, in dimension in terms of the direction perpendicular to the direction in which they are arrayed in parallel, than the roof mirror next thereto on the bottom side of the ink container. Therefore, as the liquid (ink) in the liquid container 45 is consumed, not only does the peak value of the amount (intensity) of the light reflected by the reflective member 30 change, for example, from the value (1) to the value (2), and then, to the value (1), but also the width of the above described pattern of the graph changes, for example, from the width 1 to the width 2, and then, to the width 3.

More specifically, as the liquid (ink) in the liquid container 45 is consumed, the liquid (ink) level in the liquid container 45 falls in the direction indicated by an arrow mark B in FIG. 9(*b*) (from top side of reflective member 30 toward bottom side), gradually exposing the roof mirrors one by one. As described earlier regarding the optical properties of the reflective member, the roof mirrors in contact with the ink transmit light, that is, do not reflect light. Therefore, as the number of the roof mirrors 34 of the reflective member 30, which are not in contact with the ink, increases (number of roof mirrors 34 in contact with ink decreases), the amount (intensity) of the light reflected by the reflective member increases, for example, from the value (2) to the value (1) in FIG. 9(*c*). Further, the dimension, in terms of the moving direction of the carrier, of the area of the reflective member by which the light is reflected increases, for example, from the width 1 to the width 2, because the reflective member 30 is shaped so that the closer to the bottom wall of the container a given portion thereof, the wider the given portion thereof, in terms of the direction perpendicular to the direction in which the roof mirrors are arrayed in parallel.

Thus, the amount of the liquid (ink) can be analogically detected based on the changes in the peak value of the amount (intensity) of the light reflected by the reflective member (roof mirror unit) 30, and the changes in the width, in terms of the moving direction of the carrier, of the pattern of the graph showing the changes in the amount of the light intercepted by the photosensitive element. This method, described above, detects the amount of the ink in the ink container based on two types of variables, that is, the changes in the peak value of the amount (intensity) of the light reflected by the reflective member (roof mirror unit) 30, and the changes in the width, in terms of the moving direction of the carrier, of the pattern of the graph showing the changes in the amount of the light intercepted by the photosensitive element. Therefore, it is more advantageous than the first embodiment in that it is capable of precisely detecting the amount of the ink in the ink container, even if the amount of the ink in the ink container becomes very small, and therefore, the amount by which the light is reflected by the reflective member becomes very small. In this embodiment, the reflective member is structured so that its width, in terms of the direction perpendicular to the direction in which the roof mirrors 34 are arrayed in parallel, is such that the closer to the bottom wall of the ink container a given portion of the reflective member, the wider the given portion. However, the above described width of the reflective member may be made to be such that the closer to the bottom wall of the ink container a given portion of the reflective member, the narrower the given portion.

Embodiment 3

This embodiment is another modification of the first embodiment of the present invention. It is different from the first embodiment, in the direction in which the roof mirrors of the roof mirror unit (reflective member) are arrayed in parallel. Next, this embodiment will be described in detail.

Figure 10:
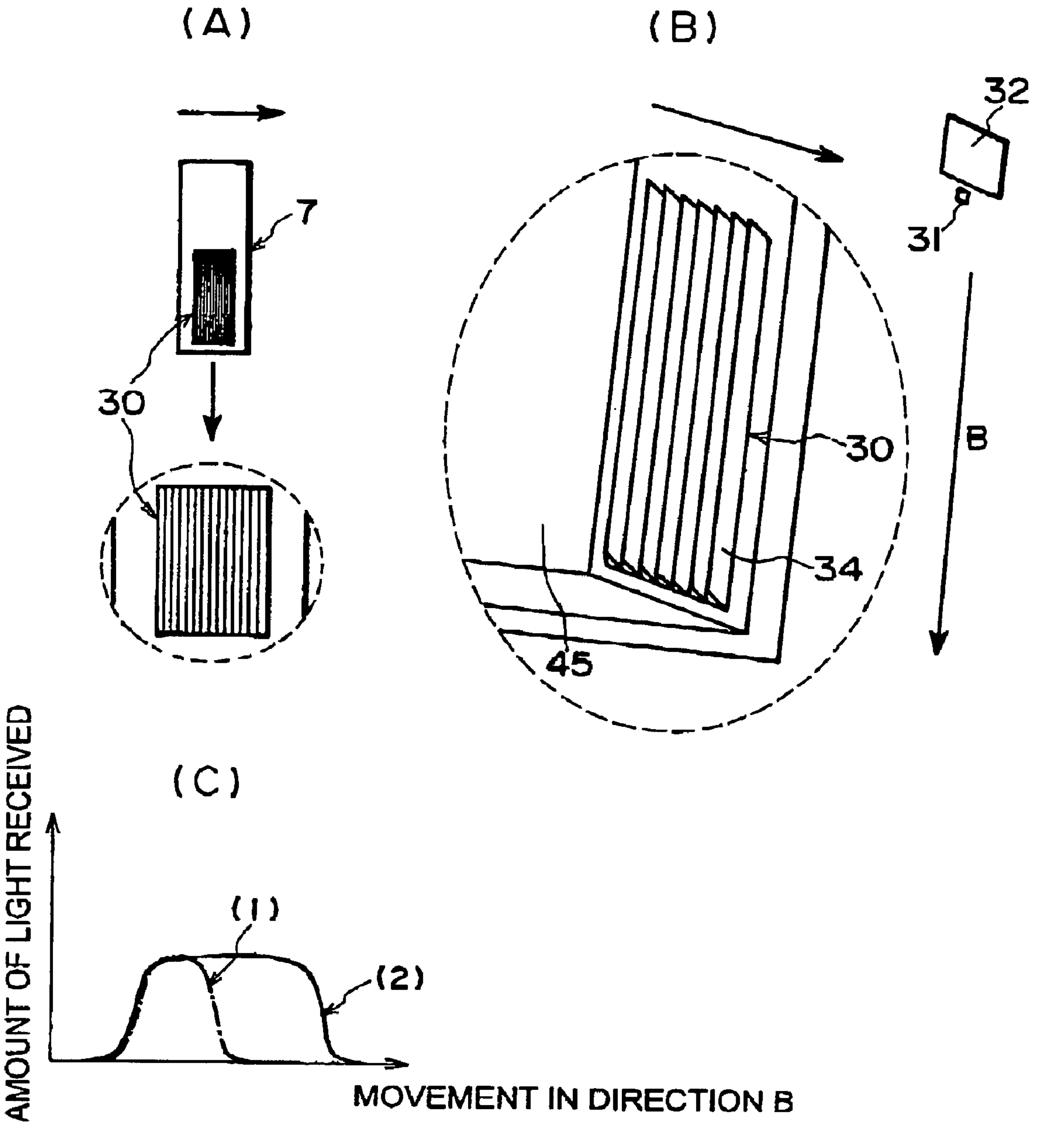
FIG. 10 is a schematic drawing for describing the reflective member in the third embodiment of the present invention, FIG. 10(*a*) being an enlarged plan view of the roof mirror portion of the reflective member on one of the side walls of the ink container, FIG. 10(*b*) being a perspective view of the roof mirror portion of the reflective member, and FIG. 10(*c*) being a graph showing the changes in the amount of the light intercepted by the photosensitive side when the roof mirrors are arranged in the pattern in the third embodiment.

FIG. 10 is a drawing for depicting the reflective member in the third embodiment of the present invention, FIG. 10(*a*) being an enlarged plan view of the roof mirror portion of the reflective member on one of the side walls of the ink container, FIG. 10(*b*) being a perspective view of the roof mirror portion of the reflective member, and FIG. 10(*c*) being a graph showing the changes in the amount of the light received by the photosensitive element in the third embodiment of the present invention.

Referring to FIG. 10(*a*), the reflective member (roof mirror unit) 30 in this embodiment is attached to the one of the side walls of the ink container 7 so that the direction in which the roof mirrors of the reflective member are arrayed in parallel coincides with the moving direction A of the ink container 7 (moving direction of carriage). This embodiment is substantially different from the first and second embodiments in that unlike the solidly attached detecting apparatuses in the first and second embodiments, the detecting apparatus in this embodiment is movable in the direction indicated by an arrow mark B. More specifically, in this embodiment, in order to detect the amount of the ink in the ink container, the ink container is moved to a predetermined position (for example, position corresponding to home position of carriage) by the carriage, and the detecting apparatus (combination of light emitting element 31 and photosensitive element 32) is moved in the direction of an arrow mark B while intercepting the light reflected by the reflective member.

As the detecting apparatus (combination of light emitting element 31 and photosensitive element 32) is moved in the direction of the arrow mark B, with the reflective member having the plurality of roof mirrors arrayed as described above being at the position corresponding to the home position of the carriage (with ink container 7 being stationary), the pattern of the graph showing the changes in the amount of the light intercepted by the photosensitive element shown in FIG. 1 becomes as shown in FIG. 10(*c*).

As will be evident from the pattern of the graph showing the changes in the amount of the light intercepted by the photosensitive element of the detecting apparatus during the movement of the detecting apparatus, the width of the above described pattern is affected by the difference in the size of the portion of the reflective area (roof mirrors) of the reflective member, which is in contact with the ink; for example, it changes from the width (1) to the width (2).

More specifically, as the liquid (ink) in the liquid container 45 is consumed, the liquid (ink) level in the liquid container 45 falls in the direction indicated by an arrow mark B in FIG. 10(*b*) (from top side of reflective member 30 toward bottom side), gradually exposing the reflective member (roof mirror unit) 30 from the liquid, from the top side. As described earlier regarding the optical properties of the reflective member, the roof mirrors in contact with the ink transmit light, that is, do not reflect light. Therefore, as the width (size) of the portion of the reflective member 30 which is not in contact with the ink, in terms of the direction perpendicular to the direction in which the roof mirrors 34 are arrayed in parallel, increases (portion of reflective member 30 which is in contact with ink decreases), the width of the pattern of the graph showing the changes in the amount of the light reflected by the reflective member 30 and intercepted by the photosensitive element 32 increases from the width of the pattern (1) to that of the pattern (2).

In other words, in this embodiment, the amount of the liquid (ink) can be analogically detected based on the changes in the width of the pattern of the graph showing the changes in the amount of the light intercepted by the photosensitive element.

Incidentally, in this embodiment, the detecting apparatus is moved from the top of the ink container 7 to the bottom (from top of reflective member 30 to bottom) as indicated by the arrow mark B in FIG. 10(*b*). However, the detecting apparatus may be moved in reverse.

Miscellaneous Embodiments

For ease of description, the amount of the light intercepted by the photosensitive element due to diffraction is not given in the drawings showing the amount of the light intercepted by the photosensitive element (FIGS. 8(*c*), 9(*c*), and 10(*c*)).

Figure 11:
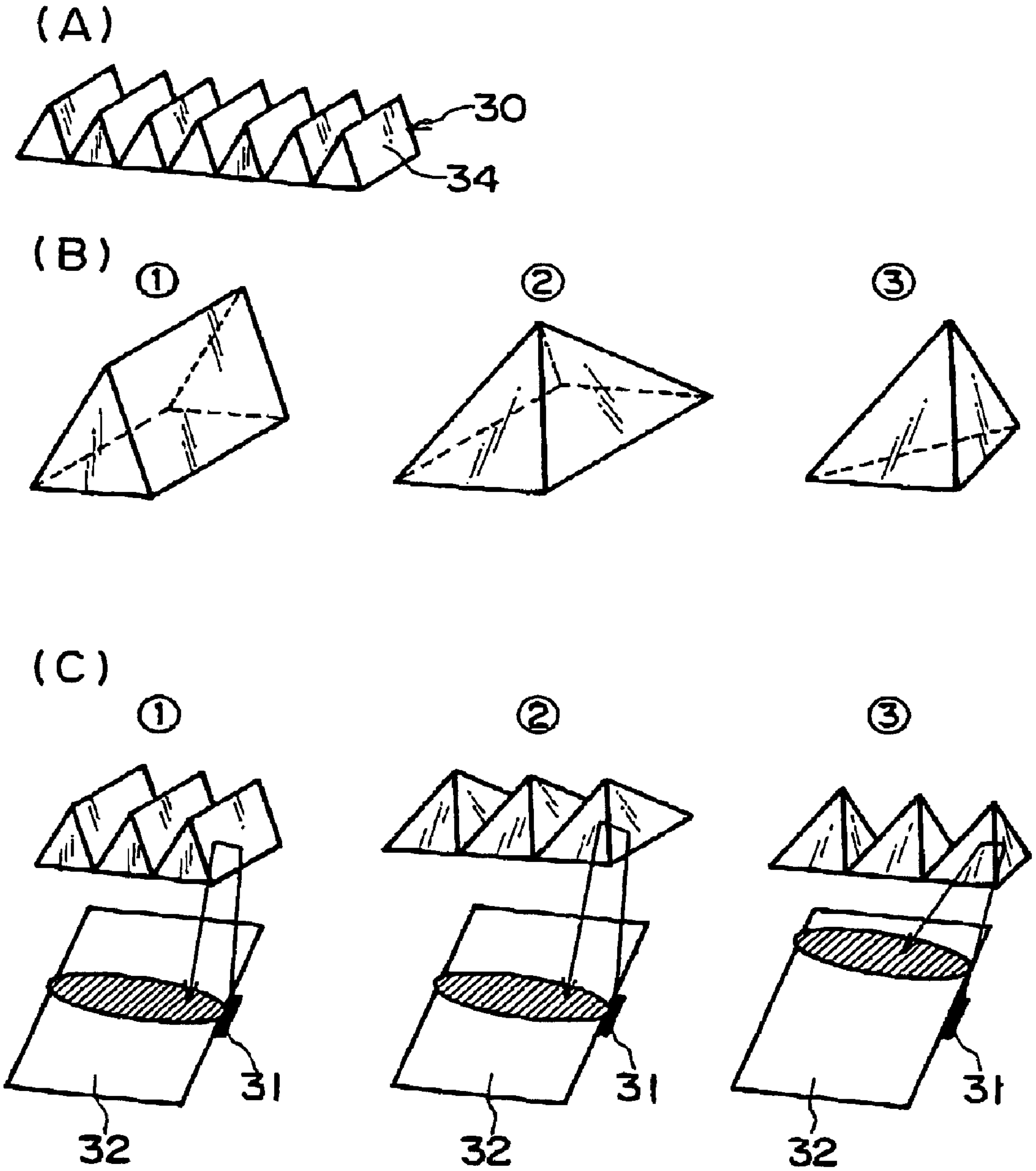
FIG. 11 is a perspective view of a few of the modified versions of the reflective member for the liquid container in accordance with the present invention.

In each of the preceding embodiments, the shape of the reflective portion of the reflective member was as shown in FIG. 11(*a*), and each of the plurality of roof mirrors of the reflective member was as shown in FIG. 11(*b*)-1. Thus, the light from the point-source light is deflected twice by each roof mirror (which is not in contact with the liquid (ink)) so that it condenses on the photosensitive element, as shown in FIG. 11(*c*)-1. However, the shape of the roof mirror of the reflective member in accordance with the present invention does not need to be limited to the shape in the preceding embodiments. In other words, the shape may be as shown in FIG. 11(*b*)-2 or 11(*b*)-3 (triangular pyramid-polygonal pyramid), which also deflects the light from the point-source light twice as shown in FIG. 11(*c*)-2 or 11(*c*)-3, respectively. Further, in the preceding embodiments, the light from the point-source light is deflected only twice. However, the deflection may occur three times or more, as it will if each roof mirror is in the form of a polygonal pyramid. Further, the effects of such an embodiment of the present invention are the same as those of the preceding embodiments.

In the first to third embodiments, the number of reflective members provided to the ink container was always one. However, the number may be two or more, and when the ink container 7 is provided with two or more reflective members, the amount of the liquid (ink) can be detected in the same manner as described above. Also in the first to third embodiments, the roof mirrors which make up the reflective member are arrayed in parallel, in connection to the immediately adjacent roof mirrors, and in a predetermined direction. However, they may be arrayed with predetermined intervals, and when they are arrayed with the intervals, the amount of liquid (ink) can be detected in the same manner as described regarding the first to third embodiments. Further, the reflective surfaces of each roof mirror, which come into contact with the ink, may be coated with water repelling agent or the like, because when the reflective surfaces (interface) is water repellent, ink is less likely to remain on the roof mirror, improving therefore the accuracy with the amount of the ink is detected.

If a plurality of ink containers different in the color (magenta, yellow, cyan, black, etc.) of the ink to be filled therein are made different in the structure of the reflective member attached thereto, by utilizing the difference in structure among the reflective members in the first to third embodiments, not only can the amount of the ink be analogically detected, but also it is possible to identify the ink containers in terms of the color of the ink to be filled therein.

In the first and second embodiments, the means for detecting the amount of the ink in the ink container was structured so that the ink container was moved by the carriage to detect the light reflected by the reflective member. However, the effects similar to those obtained by the ink remainder amount detecting means in the first and second embodiments can be obtained by such a structural arrangement as the one in the third embodiment in which the detecting apparatus comprising a light projecting element (light emitting element) and a photosensitive element for detecting the reflected light is moved. Moreover, the light projecting element (light emitting element) and photosensitive element may be independent from each other as in this embodiment, or integral with each other.

Lastly, referring to FIG. 12, an example of an ink jet recording apparatus in which the above described ink container is mountable will be described.

Figure 12:
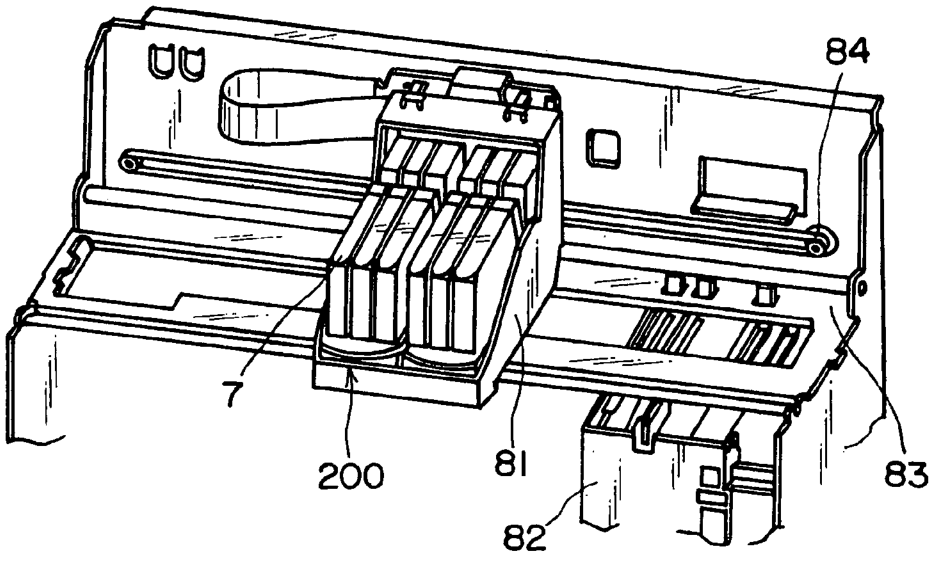
FIG. 12 is a perspective view of an example of a recording apparatus in which a liquid container in accordance with the present invention is mountable.
Figure 13:
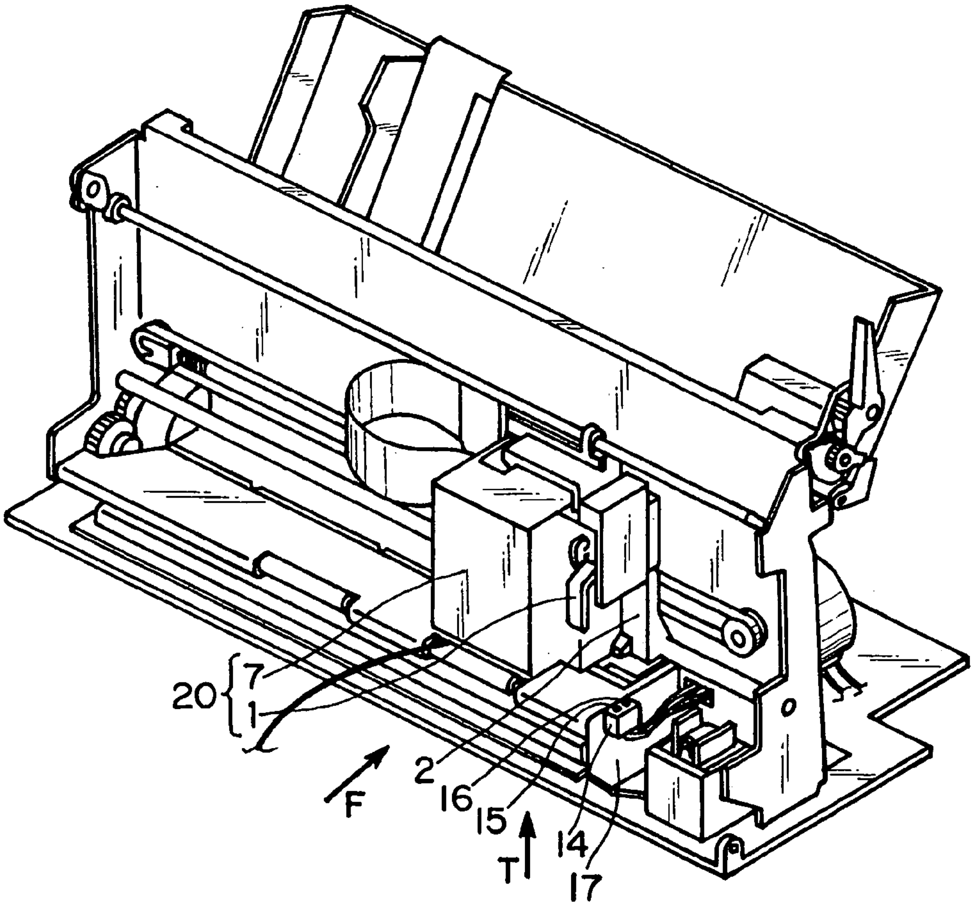
FIG. 13 PRIOR ART
FIG. 13 is a perspective view of a typical ink jet recording apparatus having the ink amount detecting function in accordance with the prior arts.
Figure 14:
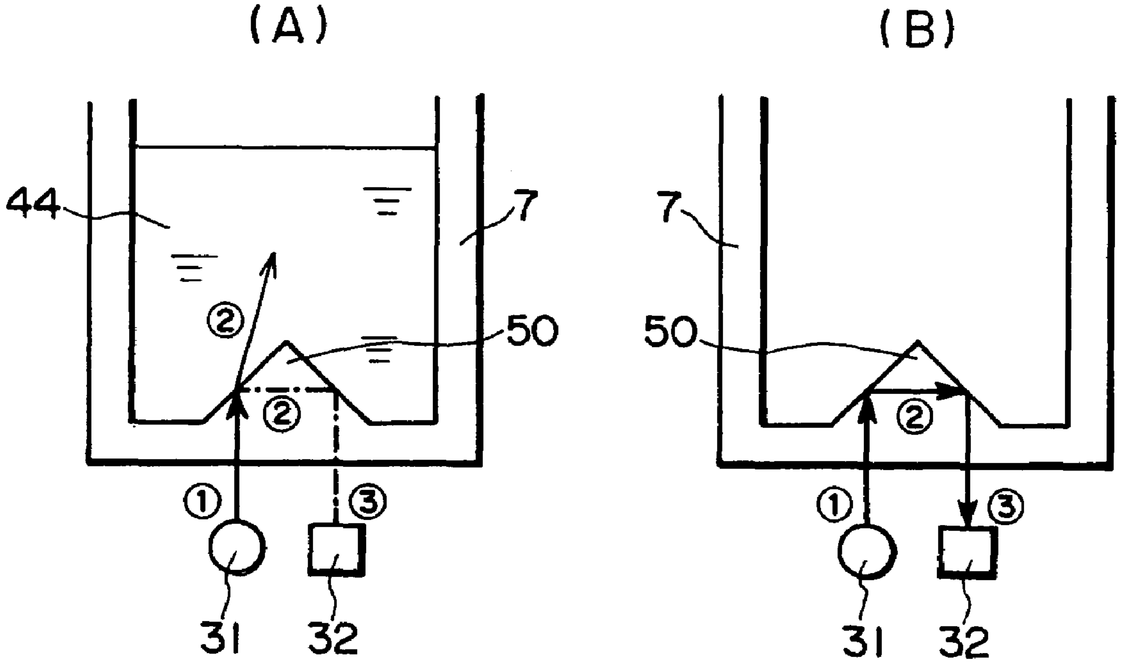
FIG. 14 PRIOR ART
FIG. 14 is a schematic drawing for showing the reflective surfaces of the bottom portion of the ink container in accordance with the prior arts.

The recording apparatus shown in FIG. 12 comprises a carriage 81, a head recovery unit 82, and a sheet bed 83. The carriage 81 holds a head holder 200 which is equipped with a plurality of ink jet recording heads (unshown), and in which a plurality of ink containers 7 having the reflective member 30 comprising a plurality of the above described roof mirrors 34 are removably mountable. The head recovery unit 82 comprises: a head cap for preventing the bodies of ink in the plurality of orifices of the ink jet recording heads from drying up; and a suction pump for suctioning the ink from the plurality of orifices as the recording heads malfunction. The sheet bed 83 is a sheet supporting member, across the top surface of which a recording paper as a recording medium is conveyed.

The home position of the carriage 81 is directly above the recovery unit 82. As a belt 84 is driven by a motor or the like, the carriage is moved leftward in the drawing. During this leftward movement of the carriage, ink is ejected from the ink jet recording heads toward the recording paper on the sheet bed (platen) 83. As a result, an image is formed on the recording paper.

While the invention has been described with reference to the structures disclosed herein, it is not confined to the details set forth, and this application is intended to cover such modifications or changes as may come within the purposes of the improvements or the scope of the following claims.

What is claimed is:

1. A liquid container for containing liquid, comprising:

a reflection member provided in a liquid containing portion and having a plurality of roof mirror assemblies arranged in a predetermined direction, each of said roof mirror assemblies having at least two reflecting surfaces positioned with a predetermined angle therebetween;

wherein said reflection member is effective to divide incident light, which is scattering light, into a plurality of light beams by said plurality of roof mirror assemblies and to condense at a predetermined detection position the beams sequentially reflected by the at least two reflecting surfaces of the roof mirror assemblies; and wherein an amount of the liquid in said liquid container is detected on the basis of the light reflected by said reflection member;

and wherein said reflection member is provided on an inner surface of said liquid containing portion.

2. A liquid container according to claim 1, wherein said reflection member is is provided on a surface relating to a height of said liquid container.

3. A method for detecting an amount of the ink in a liquid container, comprising:

a step of preparing a reflection member provided in a liquid containing portion and having a plurality of roof mirror assemblies arranged in a predetermined direction, each of said roof mirror assemblies having at least two reflecting surfaces positioned with a predetennined angle therebetween;

wherein said reflection member is effective to divide incident light, which is scattering light, into a plurality of light beams by said plurality of roof mirror assemblies and to condense at a predetermined detection position the beams sequentially reflected by the at least two reflecting surfaces of the roof mirror assemblies;

detecting an amount of the liquid in said liquid container on the basis of the light reflected by said reflection member;

wherein said reflection member is provided on an inner surface of said liquid containing portion.

4. A liquid ejection recording apparatus for effecting recording by ejecting liquid from a liquid container as defined in any one of the proceeding claims, said apparatus comprising: a carriage for carrying said liquid container; and detecting means for detecting an amount of the liquid in said liquid container on the basis of the light.

5. An apparatus according to claim 4, wherein said detecting means includes a light emitting source and a photoreceptor.

6. An apparatus according to claims 5, wherein said light emitting source and said photoreceptor are integral with each other.

* * * * *

UNITED STATES PATENT AND TRADEMARK OFFICE

CERTIFICATE OF CORRECTION

PATENT NO. : 7,055,926 B2 
APPLICATION NO. : 10/642732
DATED : June 6, 2006
INVENTOR(S) : Yoshinori Kojima et al.

It is certified that error appears in the above-identified patent and that said Letters Patent is hereby corrected as shown below:

ON THE TITLE PAGE ITEM (*)

Please insert the following notice: --This patent is subject to a terminal disclaimer.--

IN THE ABSTRACT:

Line 1, “incldes” should read --includes--.

COLUMN 7

Line 25, “slanged” should read --slanted--.

COLUMN 9

Line 6, “descried” should read --described--; and
Line 14, the second occurrence of “in which” should be deleted.

COLUMN 16

Line 18, “is is” should read --is--; and
Line 49, “claims 5,” should read --claim 5--.

Signed and Sealed this

Twenty-sixth Day of December, 2006

JON W. DUDAS
*Director of the United States Patent and Trademark Office*